United States Patent [19]

Zun

[11] Patent Number: 4,985,960
[45] Date of Patent: Jan. 22, 1991

[54] CASTER WITH LEVER FOR BRAKING AND DIRECTION SETTING

[76] Inventor: Hong-Fu Zun, No. 59, Alley 85, Lane 673, Chung Chen Road, Yi-Chia Village, Jen Te Hsiang, Tainan Hsien, Taiwan

[21] Appl. No.: 489,097

[22] Filed: Mar. 6, 1990

[51] Int. Cl.$^5$ .................... B60B 33/00; B60T 1/00
[52] U.S. Cl. .................... 16/35 R; 188/1.12; 188/31
[58] Field of Search .................... 188/1.12, 19, 20, 27, 188/31, 60, 69, 194, 265; 16/35 R

[56] References Cited

U.S. PATENT DOCUMENTS

| | | | |
|---|---|---|---|
| 4,608,729 | 9/1986 | Huang | 16/35 R |
| 4,649,596 | 3/1987 | Kassai | 16/35 R |
| 4,805,259 | 2/1989 | Kassai | 188/1.12 X |

Primary Examiner—Robert J. Oberleitner
Assistant Examiner—Josie Ballato
Attorney, Agent, or Firm—Nixon & Vanderhye

[57] ABSTRACT

A caster-supporting device for a stroller includes a caster-mounting member for extension of a caster axle therethrough, a connector secured to the bottom of the stroller body and having a cylindrical lower portion journalled on the caster-mounting member, and a control body mounted pivotally on the caster-mounting member. Normally, the connector can rotate relative to the caster-mounting member. When the control body is moved to a first position, the key of the control body is inserted into the keyway of the connector, so as to prevent rotation of the connector relative to the caster-mounting member, thereby setting the direction of the caster. When the control body is moved to a second position, the gripping rod of the control body moves to a position between two adjacent spokes of a spoke member which is secured to the caster, so as to prevent any rolling of the caster. Simultaneously, the two parallel clamping plates of the control body move to clamp two parallel side surfaces of the connector therebetween, so as to prevent rotation of the connector relative to the caster-mounting member. A bump (13) on the side surface of the caster-mounting member acts to secure the control body into each of its three positions by seating into one of three holes (331-333) in the control body.

1 Claim, 5 Drawing Sheets 4,985,960

CASTER WITH LEVER FOR BRAKING AND DIRECTION SETTING

BACKGROUND OF THE INVENTION

This invention relates to a caster-supporting device for a stroller, more particularly to a caster-supporting device which can be selectively adjusted to a first position in which the direction of the caster is set, or a second position in which the direction of the caster is set and any rolling of the caster is prevented.

Referring to FIG. 1, a conventional caster-supporting device for a stroller includes a connector (A) secured to the bottom of the stroller body, a caster-mounting member (B) provided for the extension of the caster axle therethrough, a vertical tube (C) connected pivotally to the front portion of the caster-mounting member (B), a rotating shaft (D) journalled within the vertical tube (C), and a sliding block (E) with a dovetail groove. As illustrated, the sliding block (E) is engaged with both the dovetail tongue (A1) of the connector (A) and the dovetail tongue (C1) of the vertical tube (C), so as to prevent rotation of the connector (A) relative to the caster-mounting member (B). The sliding block (E) can be moved upward to disengage from the dovetail tongue (C1) of the vertical tube (C), so as to enable the connector (A) to rotate relative to the caster-mounting member (B). Normally, each caster is equipped with a gripping rod. The gripping rod can be moved to a position between two adjacent spokes of the caster, so as to prevent the caster from rolling on the ground. When the user desires to prevent the caster from rolling and set the direction of the caster, the user must move both the gripping rod and the sliding block (E).

SUMMARY OF THE INVENTION

It is therefore the main object of this invention to provide a caster-supporting device for a stroller which can complete braking and direction-setting of a caster by an actuation of an element.

According to this invention, a caster-supporting device for a stroller includes a caster-mounting member for extension of a caster axle therethrough, a connector secured to the bottom of the stroller body and having a cylindrical lower portion journalled on the caster-mounting member, and a control body mounted pivotally on the caster-mounting member. Normally, the connector can rotate relative to the caster-mounting member. When the control body is moved to a first position, the key of the control body is inserted into the keyway of the connector, so as to prevent rotation of the connector relative to the caster-mounting member, thereby setting the direction of the caster. When the control body is moved to a second position, the gripping rod of the control body moves to a position between two adjacent spokes of a spoke member which is secured to the caster, so as to prevent any rolling of the caster. Simultaneously, the two parallel clamping plates of the control body move to clamp two parallel side surfaces of the connector therebetween, so as to prevent rotation of the connector relative to the caster-mounting member.

BRIEF DESCRIPTION OF THE DRAWING

Other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
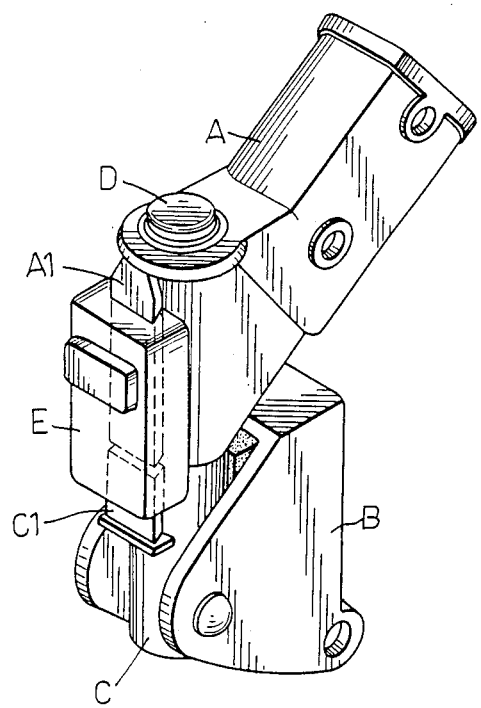
FIG. 1 is a perspective view of a conventional caster-supporting device for a stroller.
Figure 2:
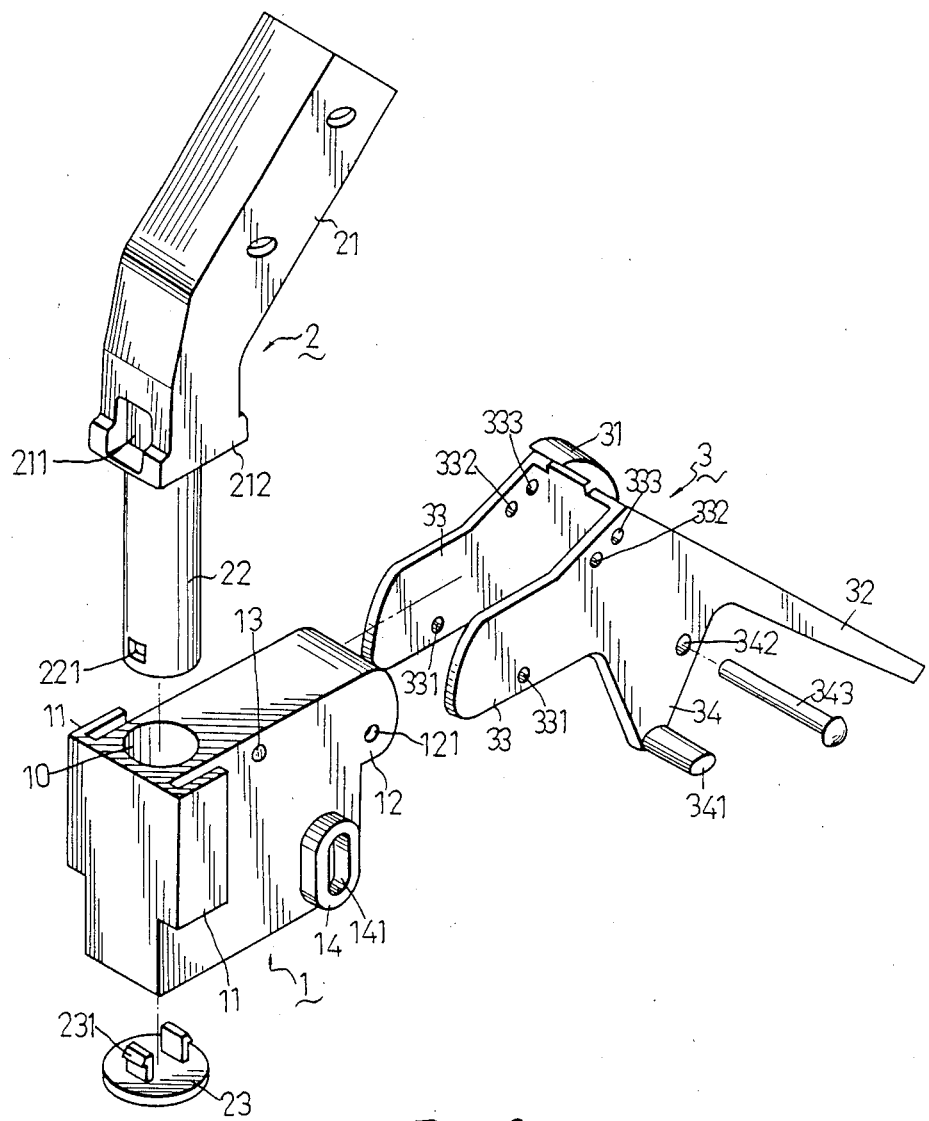
FIG. 2 is an exploded view of a caster-supporting device for a stroller according to this invention.

Referring to FIG. 2, a caster-supporting device of this invention includes a caster-mounting member 1, a connector 2 and a control body 3.

The caster-mounting member 1 includes a vertical hole 10 formed through the front portion thereof, and two generally L-shaped wing plates 11 defining two slide slots between the main body of the caster-mounting member 1 and the wing plates 11. A projection 12 extends from the rear end of the caster-mounting member 1 and has a horizontal pivot hole 121. Two bumps 13 are respectively provided on two side surfaces of the caster-mounting member 1. Two elliptical ears 141 are respectively provided on two side surfaces of the caster-mounting member 1 below the bumps 13. A caster axle 41 (see FIGS. 3 to 5) extends through the ears 141 in a conventional manner.

The connector 2 has an upper portion 21 connected securely to the bottom of the stroller body, and a cylindrical lower portion 22 extending through the vertical hole 10 of the caster-mounting member 1. The upper portion 21 of the connector 2 has two parallel side surfaces 212. Two keyways 211 are formed in two side surfaces of the upper portion of the connector 2. Two rectangular holes 221 are formed in two side surfaces of the lower portion 22 of the connector 2. A retaining member 23 includes a circular base plate and two barbs 231 provided on the top surface of the base plate. The barbs 231 of the retaining member 23 are engaged within the rectangular holes 221 in the lower portion 22 of the connector 2, so as to retain the connector 2 on the caster-mounting member 1.

The control body 3 includes a key 31 secured to the front portion thereof, a push lever 32 secured to the rear portion of the control body 3, and two parallel clamping plates 33 disposed at the front end portion of the control body 3. The front ends of the clamping plates 33 are disposed respectively and slidably within the slide slots defined by the wing plates 11 of the caster-mounting member 1. Each of the clamping plates 33 has a first positioning hole 331, a second positioning hole 332 and a third positioning hole 333. Two horizontal gripping rods 341 respectively extend outward from two legs 34 of the control body 3. Two pivot holes 342 are respectively formed through the legs 34 of the control body 3 in alignment with the pivot hole 121 of the caster-mounting member 1, so that a pivot pin 343 can extend therethrough, thereby mounting the control body 3 rotatably on the caster-mounting member 1.

Figure 3:
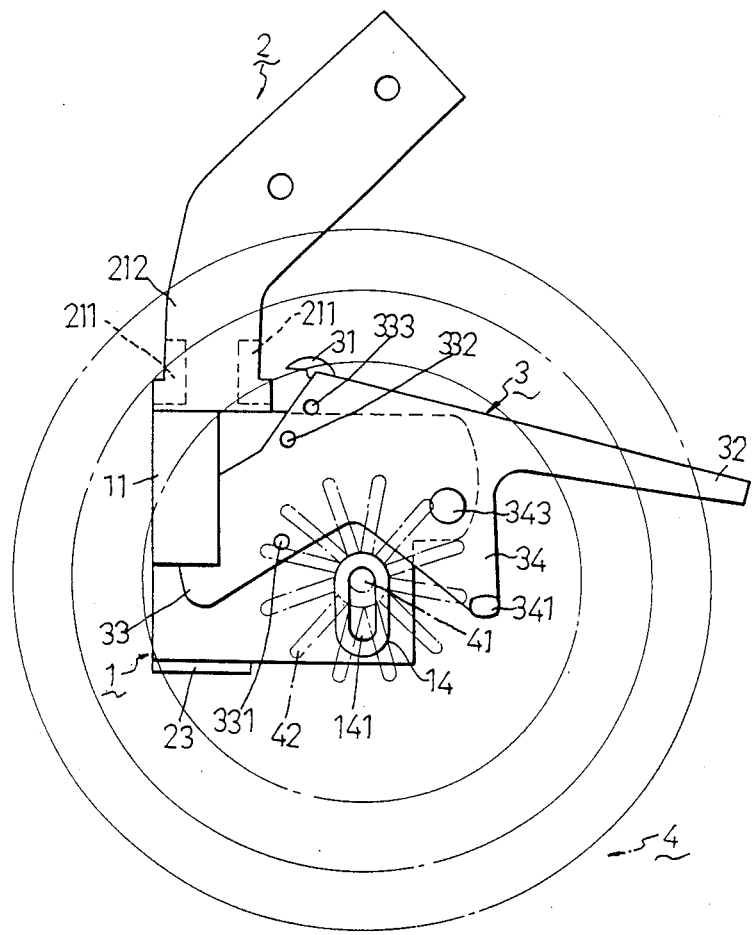
FIG. 3 is an assembled elevational view showing the caster-supporting device for a stroller of this invention.

Referring to FIG. 3, a spoke member 42 is secured to the center of a caster 4 and includes a plurality of spokes extending radially from the center of the caster 4. In assembly, the bumps 13 of the caster-mounting member 1 are engaged within the second positioning holes 332. As illustrated, the gripping rods 341 are spaced apart from the spoke member 42. The clamping plates 33 are spaced apart from the parallel side surfaces 212 of the connector 2. The key 31 of the control body 3 is spaced apart from the keyways 212 of the connector 2. In this way, the connector 2 can rotate relative to the caster-mounting member 1, so that the caster can rotate freely.

Figure 4:
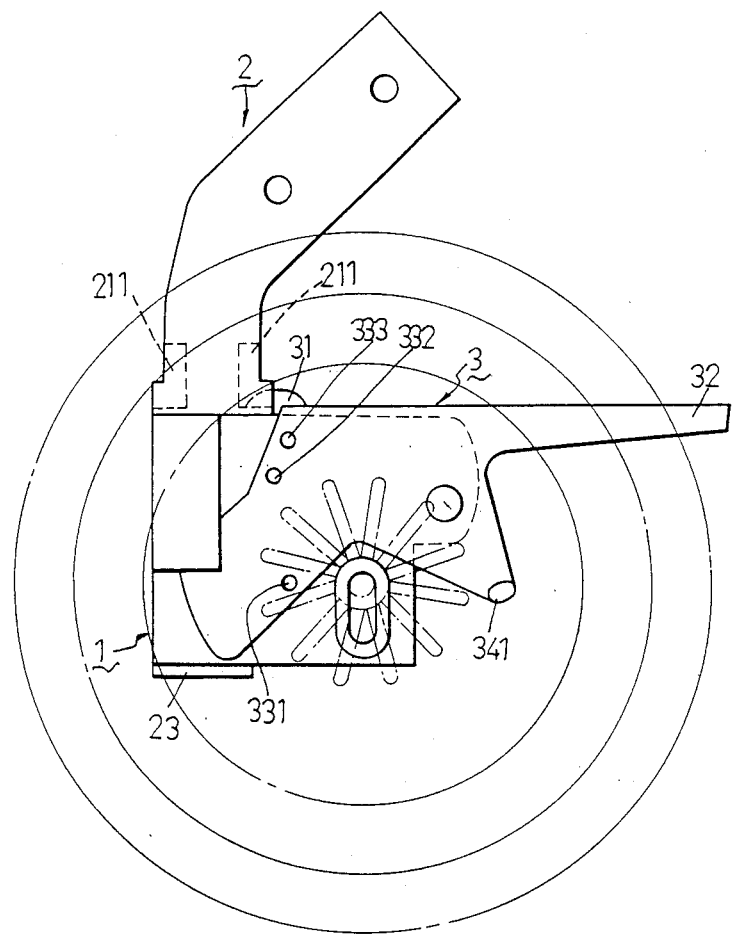
FIGS. 4 and 5 are schematic views illustrating the operation of the caster-supporting device for a stroller of this invention.

Referring to FIG. 4, when it is desired to set the direction of the caster 4, the push lever 32 is depressed to engage the bumps 13 of the caster-mounting member 1 within the third positioning holes 333 of the control body 3, so as to insert the key 31 of the control body 3 into one of the keyways 211 of the connector 2, thereby preventing the connector 2 from rotating relative to the caster-mounting member 1. The direction of the caster 4 is thus set.

Figure 5:
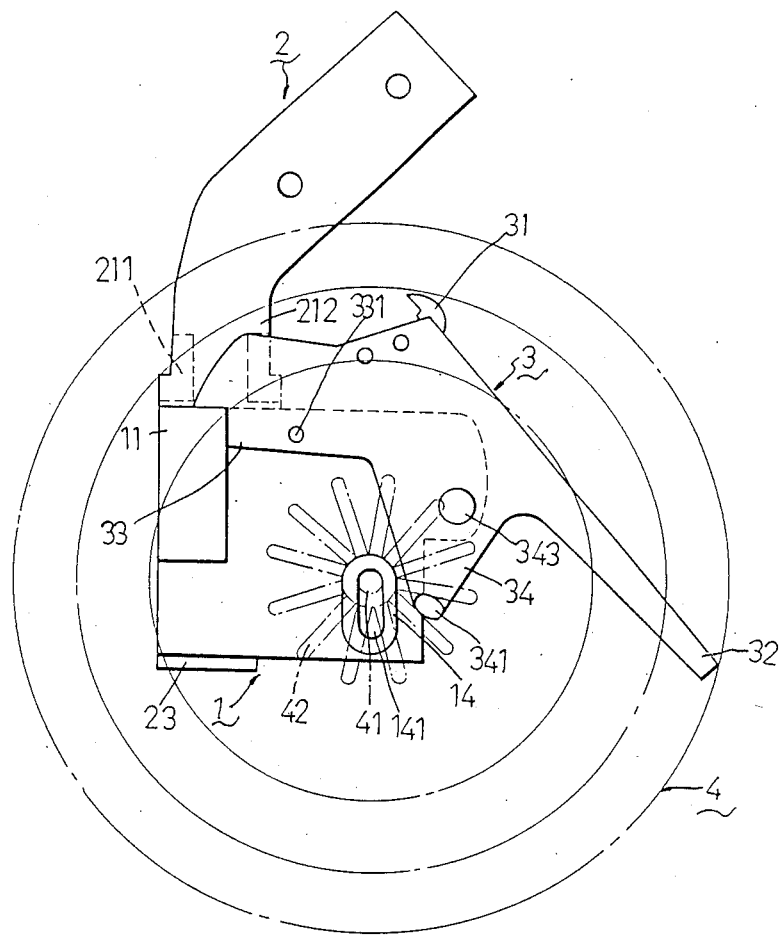

Referring to FIG. 5, when it is desired to effect the brake and direction-setting of the caster 4, the push lever 32 can be pulled upward to rotate the gripping rod 341 to a position between two adjacent spokes of the spoke member 42 and clamp the parallel side surfaces 212 of the connector 2 with the clamping plates 33. The results of this actuation of the push lever 32 are such that the connector 2 cannot rotate relative to the caster-mounting member 1 and the caster 4 cannot roll on the ground.

With this invention thus explained, it is apparent that numerous modifications and variations can be made without departing from the scope and spirit of this invention. It is therefore intended that this invention be limited only as indicated in the appended claims.

I claim:

1. A caster-supporting device comprising:

a caster-mounting member adapted for extension of a caster axle therethrough and including a bump provided on a side surface thereof, and two slide slots formed in two sides of said caster-mounting member;

a connector having two parallel side surfaces, a cylindrical lower portion journalled on said caster-mounting member in such a manner that said cylindrical lower portion can rotate about a vertical axis, and a keyway formed in said connector;

a spoke member adapted to connect securely to center of a caster and including a plurality of spokes extending radially from said center of said caster; and a control body, mounted pivotally on said caster-mounting member in such a manner that said control body can rotate about a horizontal axis, including a first positioning hole, a second positioning hole normally engaged with said bump of said caster-mounting member, so as to position said control body relative to said caster-mounting member, a third positioning hole, a push lever secured to said control body, a horizontal gripping rod extending outwardly from a side surface of said control body, a key provided on said control body and normally spaced apart from said keyway of said connector, and two parallel clamping plates secured to said control body and received respectively and slidably within said slide slots of said caster-mounting member at front ends of said clamping plates, said clamping plates being normally spaced apart from said parallel side surfaces of said connector, said gripping rod being normally spaced apart from said spoke member;

all of said first, second and third positioning holes being formed in an inner surface of said clamping plate, said push lever being capable of being actuated to rotate said control body relative to said caster-mounting member, so as to disengage said bump from said second positioning hole, thereby selectively engaging one of said first and third positioning holes with said bump, engagement of said bump within said first positioning hole locating said gripping rod between an adjacent pair of said spokes and clamping said parallel side surfaces of said connector between said clamping plates, so as to prevent both relative rotation between said connector and said caster-mounting member and rolling of said caster, engagement of said bump within said third positioning hole inserting said key of said control body into said keyway of said connector, so as to prevent rotation of said caster-mounting member relative to said connector while permitting rolling of said caster.

* * * * *